(12) United States Patent
Haskell et al.

(10) Patent No.: US 7,852,353 B1
(45) Date of Patent: Dec. 14, 2010

(54) ENCODING A TRANSPARENCY (ALPHA) CHANNEL IN A VIDEO BITSTREAM

(75) Inventors: Barin Geoffry Haskell, Mountain View, CA (US); David William Singer, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 755 days.

(21) Appl. No.: 11/095,013

(22) Filed: Mar. 31, 2005

(51) Int. Cl.
G09G 5/377 (2006.01)

(52) U.S. Cl. ..................................... 345/629

(58) Field of Classification Search .................. 345/629
See application file for complete search history.

(56) References Cited

U.S. PATENT DOCUMENTS

| | | | |
|---|---|---|---|
| 5,459,529 A | 10/1995 | Searby et al. | |
| 5,490,246 A | 2/1996 | Brotsky et al. | 395/161 |
| 5,534,917 A | 7/1996 | MacDougall | |
| 5,687,306 A | 11/1997 | Blank | |
| 5,742,599 A * | 4/1998 | Lin et al. | 370/395.65 |
| 5,748,775 A | 5/1998 | Tsuchikawa et al. | |
| 5,781,198 A | 7/1998 | Korn | |
| 5,812,787 A | 9/1998 | Astle | |
| 5,914,748 A | 6/1999 | Parulski et al. | |
| 5,923,791 A | 7/1999 | Hanna et al. | |
| 5,949,433 A * | 9/1999 | Klotz | 345/634 |
| 5,953,076 A * | 9/1999 | Astle et al. | 348/584 |
| 6,006,231 A | 12/1999 | Popa | 707/101 |
| 6,035,060 A * | 3/2000 | Chen et al. | 382/164 |
| 6,118,427 A * | 9/2000 | Buxton et al. | 345/629 |
| 6,134,243 A * | 10/2000 | Jones et al. | 370/465 |
| 6,144,391 A * | 11/2000 | Hinson et al. | 345/540 |
| 6,219,454 B1 * | 4/2001 | Kawano et al. | 382/232 |
| 6,272,558 B1 | 8/2001 | Hui et al. | 709/328 |
| 6,348,953 B1 * | 2/2002 | Rybczynski | 348/584 |
| 6,377,269 B1 * | 4/2002 | Kay et al. | 345/589 |

(Continued)

FOREIGN PATENT DOCUMENTS

EP  548 586 A  6/1993

(Continued)

OTHER PUBLICATIONS

An approach to region coding for content-based scalable video Tsuhan Chen; Swain, C.T.; Haskell, B.G.; Image Processing, 1996. Proceedings., International Conference on vol. 3, Sep. 16-19, 1996 pp. 399-402 vol. 3.*

(Continued)

Primary Examiner—Javid A Amini
(74) Attorney, Agent, or Firm—Wong, Cabello, Lutsch, Rutherford & Brucculeri, L.L.P.

(57) ABSTRACT

Disclosed herein is a technique for delimiting the alpha channel at the NAL layer in codecs like H.264 to facilitate the optional nature of the alpha channel. In coded video sequences that include alpha, there is one alpha picture for every primary coded (e.g., luma-chroma) picture, and the coded alpha picture is contained in the same access unit as its corresponding primary coded picture. The alpha coded slice NAL units of each access unit are sent after the NAL units of the primary coded picture and redundant coded pictures, if any. The presence or absence of the alpha NAL units does not affect the decoding of the remaining NAL units in any way.

21 Claims, 1 Drawing Sheet

U.S. PATENT DOCUMENTS

| | | | |
|---|---|---|---|
| 6,400,374 B2 | 6/2002 | Lanier | |
| 6,539,121 B1* | 3/2003 | Haskell et al. | 382/239 |
| 6,603,482 B1* | 8/2003 | Tidwell | 345/592 |
| 6,618,444 B1* | 9/2003 | Haskell et al. | 375/240.24 |
| 6,717,599 B1 | 4/2004 | Olano | 345/853 |
| 6,728,315 B2* | 4/2004 | Haskell et al. | 375/240.16 |
| 7,027,659 B1* | 4/2006 | Thomas | 382/254 |
| 7,081,898 B2* | 7/2006 | Sevigny | 345/589 |
| 2001/0048770 A1* | 12/2001 | Maeda | 382/243 |
| 2002/0118217 A1 | 8/2002 | Fujiki | |
| 2002/0135615 A1* | 9/2002 | Lang | 345/764 |
| 2003/0174136 A1 | 9/2003 | Emberling et al. | |
| 2004/0051716 A1* | 3/2004 | Sevigny | 345/589 |
| 2005/0123055 A1* | 6/2005 | Winger | 375/240.25 |
| 2005/0184993 A1* | 8/2005 | Ludwin et al. | 345/502 |
| 2006/0023794 A1* | 2/2006 | Wan et al. | 375/240.29 |
| 2006/0245655 A1* | 11/2006 | Suino et al. | 382/232 |
| 2007/0030911 A1* | 2/2007 | Yoon | 375/240.25 |
| 2008/0244002 A1* | 10/2008 | Yano | 709/203 |

FOREIGN PATENT DOCUMENTS

| | | |
|---|---|---|
| EP | 0 694 879 | 1/1996 |
| EP | 1 383 080 | 1/2004 |
| WO | WO 98/45815 | 10/1998 |
| WO | WO 02/09039 A | 1/2002 |

OTHER PUBLICATIONS

International Search report dated Jul. 27, 2005 (PCT/US 05/008804; 119-0033WO).

International Search report dated Aug. 8, 2005 (PCT/US 05/008805; 119-0034WO).

Haeberli, P. et al., "The Accumulation Buffer: Hardware Support for High-Quality Rendering," Computer Graphics, New York, NY, vol. 24, No. 4, Aug. 1, 1990, pp. 309-318.

* cited by examiner

ENCODING A TRANSPARENCY (ALPHA) CHANNEL IN A VIDEO BITSTREAM

BACKGROUND

Within the last several years, digitization of video images has become increasingly important. In addition to their use in global communication (e.g., videoconferencing), digital video recording (DVDs, SVCDs, PVRs, etc.) has also become increasingly popular. In each of these applications, video (and accompanying audio) information is transmitted across communication links or stored in electronic form.

Efficient transmission, reception, and storage of video data typically requires encoding and compression of video (and accompanying audio) data. Video compression coding is a method of encoding digital video data such that less memory is required to store the video data and less transmission bandwidth is required to transmit the video data. Various compression/decompression (CODEC) schemes are frequently used to compress video frames to reduce required transmission bit rates.

Several approaches and standards to encoding and compressing source video signals exist. Historically, video compression standards have been designed for a particular application, such as ITU-T standards H.261 and H.263, which are used extensively in video conferencing applications, and the various standards promulgated by the Moving Picture Experts' Group (e.g., MPEG-1 and MPEG-2), which are typically used in consumer electronics applications. With the proliferation of various devices requiring some form of video compression, harmonization between these two groups of standards has been sought. To some extent, such standardization has been achieved by the ITU-T H.264 standard, which shares various common elements with the Moving Picture Experts' Group MPEG-4 standard, colloquially known as Advanced Video Coding or AVC. Each of these standards is incorporated by reference in its entirety.

In some cases, it is desirable to construct an image (or sequence of images) as a composite or an overlay combination of two different images. One example would be the weatherman on the nightly news standing in front of the computer-generated weather map. In this example, the video of the weatherman is recorded in front of a solid color background, e.g., a blue or green screen. In the resulting digital video images, the blue or green pixels (corresponding to the background) are set to have an alpha value corresponding to complete transparency, while the remaining pixels (which make up the image of the weatherman himself) have an alpha value corresponding to complete opacity. This image is then overlaid onto the computer-generated weather map images. As a result, the pixels having a fully transparent alpha value (the background) allow the underlying weather map to show, while the pixels having a fully opaque alpha value (the weatherman) prevent the background from showing, and instead show the image of the weatherman. The result is the familiar image of a weatherman who appears to be standing in front of a full screen weather map image.

There are a variety of other applications of transparency in image and video processing. A common element of all such applications, known to those skilled in the art, is that each pixel has a transparency, or "alpha" value associated with it. The alpha values are preferably arranged to create a "mask" image, which is preferably included in a separate channel. As originally drafted, the AVC standard did not include the capabilities for an alpha channel. However, to accommodate a wider variety of applications, it was agreed to add an alpha channel to the standard. However, accommodating the additional information required extensions to the standard, and it was desired to do so in a way that provided the most convenient and efficient processing of video having an alpha channel while simultaneously not unduly complicating the standard in the case of video that does not include an alpha channel.

Therefore, what is needed in the art is an extension to various video coding standards that allows for the convenient and efficient transmission of an alpha channel, while still preserving the optional nature of such a channel and not creating undue overhead in the video codec.

SUMMARY

Disclosed herein is a technique for delimiting the alpha channel at the NAL layer in codecs like H.264 to facilitate the optional nature of the alpha channel. In coded video sequences that include alpha, there is one alpha picture for every primary coded (e.g., luma-chroma) picture, and the coded alpha picture is contained in the same access unit as its corresponding primary coded picture. The alpha coded slice NAL units of each access unit are sent after the NAL units of the primary coded picture and redundant coded pictures, if any. The presence or absence of the alpha NAL units does not affect the decoding of the remaining NAL units in any way.

DETAILED DESCRIPTION

Figure 1:
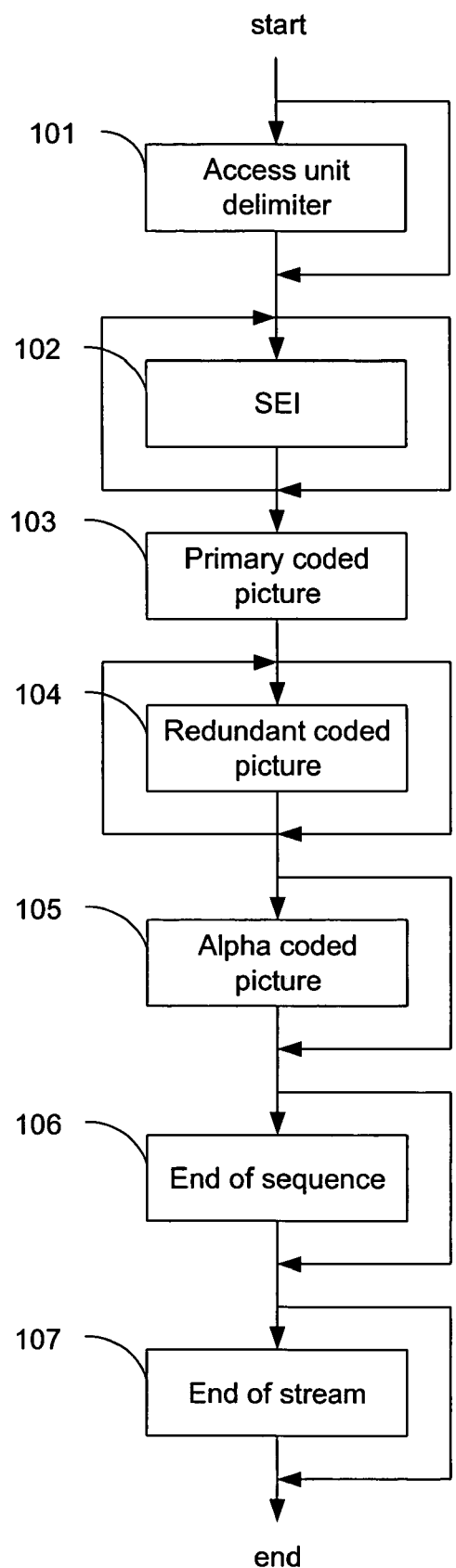
FIG. 1 illustrates the sequence of syntax structures for one coded image sequence according to the teachings of the present disclosure.

A technique for incorporating an alpha channel in a video codec is described herein. The following embodiments of the invention, described in terms of the ITU-T H.264/AVC standard are illustrative only and should not be considered limiting in any respect.

As noted above, a decision has been made by the relevant standards making bodies to add an optional alpha channel to the AVC/H.264 standards. Particularly, this optional channel is part of the AVC/H.264 Fidelity and Range Extensions ("Frext"). The alpha image or channel (i.e., transparency mask) is encoded using the standard luma coding algorithm, which is generally known to those skilled in the art. Disclosed herein is a technique for incorporating the encoded alpha channel within the video bitstream. In short, the coded alpha channel is transmitted with the video to keep the two together for ease of management, transport, processing, etc.

An AVC bitstream containing encoded video can be in one of two formats: the NAL (Network Abstraction Layer) unit stream format, or the byte stream format. The NAL unit stream format consists of a sequence of syntax structures called NAL units, each of which contain an indication of the type of data to follow and bytes containing that data. The sequence of NAL units is ordered in processing order for the decoder. Various constraints are imposed on the decoding order and on the contents of the NAL units by the standard.

The byte stream format can be constructed from the NAL unit stream format by ordering the NAL units in decoding order and prefixing each NAL unit with a start code prefix and, optionally, one or more zero-valued bytes to form a stream of bytes. Conversely, the NAL unit stream format can be extracted from the byte stream format by searching for the location of the unique start code prefix pattern within the stream of bytes. In either case, the start code prefix is a unique sequence of three bytes having the value 0x000001h. As noted, the location of a start code prefix can be used by a decoder to identify the beginning of a new NAL unit and, therefore, the end of a previous NAL unit. To ensure that a coincidental string of bytes within the NAL unit having a value equal to 0x000001h is not misinterpreted as a start code, emulation prevention bytes, which are bytes having a value 0x03h, may be included within the NAL unit. The byte stream format is specified in Annex B of H.264.

The video source represented by the bitstream is a sequence of frames (for non-interlaced video), fields (for interlaced video), or both. Collectively, these images are referred to as pictures. Each picture is comprised of one or more sample arrays. The sample arrays may be either monochrome (luma only) or color (luma and chroma, RGB, or other color sampling). The picture may also include an optional auxiliary array, which is a monochrome array used for various features, such as alpha blending, as in the context of the present disclosure. Details of the coding scheme for the various array types are generally known to those skilled in the art, and is specified in the various video coding standards, and are therefore not reproduced here in detail.

In coded video sequences that include alpha (transparency), there is one alpha picture for every primary coded (e.g., luma-chroma) picture. Preferably, the coded alpha picture is contained in the same access unit as its corresponding primary coded picture. Particularly, the alpha channel is delimited at the NAL layer to facilitate its optional nature. The alpha coded slice NAL units of each access unit are preferably sent after the NAL units of the primary coded picture and redundant coded pictures, if any. (A slice is a group of one or more macroblocks that may be some fraction of a picture or an entire picture.) The presence or absence of the alpha NAL units does not affect the decoding of the remaining NAL units in any way.

When an alpha coded picture is present, it follows the primary coded picture, i.e., foreground image and all redundant coded pictures (if present) of the same access unit. If any access unit of the sequence contains an alpha coded picture, then each access unit of the sequence shall contain exactly one alpha coded picture. NAL units of an alpha coded picture shall be considered non-VCL NAL units. When an end of sequence NAL unit is present, it shall follow the primary coded picture and all redundant coded pictures (if any) and the alpha coded picture (if any) of the same access unit.

An example sequence of NAL units is illustrated in FIG. 1. When an access unit delimiter NAL unit 101 is present, it is the first NAL unit. There are at most one access unit delimiter in any access unit. If any SEI (supplemental enhancement information, defined in Annex D of H.264) NAL units 102 are present, they precede the primary coded picture 103. The primary coded picture 103 precedes the corresponding redundant coded picture(s) 104. Following the redundant coded picture(s) 104 are auxiliary coded picture(s) 105, including an alpha picture. When an end of sequence NAL unit 106 is present, it follows the primary coded picture, all redundant coded pictures (if any) and all coded slices of an auxiliary coded picture (e.g., alpha picture), if any, without partitioning NAL units. Finally, an end of stream NAL unit 107 follows the end of sequence NAL unit 106.

Some restrictions are placed on how the alpha pictures are encoded. For example, if the primary coded picture is an instantaneous decoding refresh (IDR) picture, then the alpha picture is inferred to be an alpha IDR picture with the same identifier ("idr_pic_id" in H.264). An IDR picture is a picture that is intra coded, i.e. coded only with reference to itself and for which all subsequent pictures can be decoded without reference to a picture prior to the IDR picture.

An additional constraint on alpha coded pictures is that an alpha picture shall contain all macroblocks of a complete coded picture. Thus, there is either one complete alpha picture or no alpha picture for each primary coded picture, or, as an alternative view, there must be no alpha picture or a complete alpha picture for each primary coded picture. Furthermore, decoded slices within the same alpha picture shall cover the entire picture area and shall not overlap.

Still another constraint on alpha coded pictures is that the "redundant_pic_id" variable is equal to 0 in an alpha slice. This indicates that redundant alpha pictures are never sent.

Another constraint on the alpha picture is that the chroma (i.e., color) format of monochrome is inferred for an alpha slice. As is readily understood, the alpha picture specifies a level of transparency, and thus there is no color-dependent information in the alpha picture.

Yet another constraint on alpha coded pictures is that the bit depth of the luma component of an alpha slice is specified by the sequence parameter set extension rather than the sequence parameter set. This enables the bit depth of the alpha picture to differ from the bit depth of the luma component of the primary coded picture.

In all other ways, the coding of alpha pictures follows the same constraints specified for redundant coded pictures. Furthermore, the decoding of alpha pictures is optional. NAL units having the nal_unit_type corresponding to alpha pictures (i.e., a nal_unit_type value of 19 for H.264) may be discarded without affecting the decoding of remaining NAL units.

Once the encoded pictures are received at the decoder, alpha composition is normally performed with a background picture B (which may already be present at the decoder or may be separately transmitted), a foreground picture F, and an alpha picture A, all of the same size. For purposes of the following discussion, it is assumed that the background and foreground pictures are in luma-chroma format and that the chroma arrays of B and F have been upsampled to the same resolution as luma. For purposes of the foregoing, individual samples of B, F, and A are denoted by b, f and a, respectively. Luma and chroma samples are denoted by subscripts Y (luma) and Cb, Cr (chroma).

To reconstruct the image, the variables BitDepthAlpha and MaxAlpha are defined as follows:

BitDepthAlpha=bit_depth_alpha_minus8+8

MaxAlpha=(1<<BitDepthAlpha)−1

Thus, as is known to those skilled in the art, samples d of the displayed picture D may be calculated as:

$d_Y = (a*f_Y + (MaxAlpha−a)*b_Y + MaxAlpha/2)/MaxAlpha$ $d_{CB} = (a*f_{CB} + (MaxAlpha−a)*b_{CB} + MaxAlpha/2)/MaxAlpha$ $d_{CR} = (a*f_{CR} + (MaxAlpha−a)*b_{CR} + MaxAlpha/2)/MaxAlpha$ Alternatively, the samples of pictures D, F and B could also be composed of red, green and blue component values, in which case, reconstruction of the image would be slightly different, but still understood by one skilled in the art. Additionally, for purposes of the foregoing, it has been assumed that each component has the same bit depth in each of the pictures D, F and B. However, different components, e.g. Y and Cb, need not have the same bit depth.

A picture format that is useful for editing or direct viewing, and that is commonly used, is called pre-multiplied black video. If the foreground picture was F, then the pre-multiplied black video S is given by the following:

$$s_Y=(a*f_Y)/\text{MaxAlpha}$$

$$s_{CB}=(a*f_{CB})/\text{MaxAlpha}$$

$$s_{CR}=(a*f_{CR})/\text{MaxAlpha}$$

Pre-multiplied black video has the characteristic that the picture S will appear correct if displayed against a black background. For a non-black background B, the composition of the displayed picture D may be calculated as:

$$d_Y=s_Y+((\text{MaxAlpha}-a)*b_Y+\text{MaxAlpha}/2)/\text{MaxAlpha}$$

$$d_{CB}=s_{CB}+((\text{MaxAlpha}-a)*b_{CB}+\text{MaxAlpha}/2)/\text{MaxAlpha}$$

$$d_{CR}=s_{CR}+((\text{MaxAlpha}-a)*b_{CR}+\text{MaxAlpha}/2)/\text{MaxAlpha}$$

Note that if the pre-multiplied black video S is further processed, for example by filtering or enhancement operations, to obtain a processed pre-multiplied black video S', then the possibility of composition overflow must be taken into account. In particular, the luma of S' should not increase to the point where the composed luma would overflow, and the chroma of S' should not increase to the point where the corresponding composed red, green or blue components would overflow.

For red, green, blue composition a simple restriction may be used. Let MaxPel be the maximum value of the red, green, blue components (also usually equal to the maximum value of luma). Then any possible overflow of the composition is avoided by enforcing the following restriction for every sample of each red, green, blue component:

$$s'<(a*\text{MaxPel})/\text{MaxAlpha}$$

Another alternative is to wait until the actual composition, and clip the composed image. All of such techniques are generally understood to one skilled in the art, as well as other techniques not specifically mentioned here. It is not intended that the invention be limited to only the image reconstruction techniques described herein.

Furthermore, while the invention has been disclosed with respect to a limited number of embodiments, numerous modifications and variations will be appreciated by those skilled in the art. For example, the invention is not limited to any particular codec, device, combination of hardware and/or software, nor should it be considered restricted to either a multi purpose or single purpose device. It is intended that all such variations and modifications fall with in the scope of the following claims.

What is claimed is:

1. A method of transmitting image data for a composite image, wherein the transmitted data includes at least a foreground image and a transparency mask, the method comprising:
   encoding, by a video codec device, the foreground image;
   encoding, by the video codec device, the transparency mask;
   transmitting, by the video codec device, an image data stream comprising one or more syntax structures corresponding to the encoded foreground image and one or more syntax structures corresponding to the encoded transparency mask, wherein the one or more syntax structures corresponding to the transparency mask are delimited from and are located after the syntax structures corresponding to the foreground image in the data stream.

2. The method of claim 1 wherein the image data is encoded according to ITU Recommendation H.264.

3. The method of claim 2 wherein the image data stream is in a NAL unit format.

4. The method of claim 3 wherein the image data stream is in a byte stream format.

5. The method of claim 1 wherein there is one and only one transparency mask for each foreground image.

6. The method of claim 1, wherein the video codec device comprises hardware and software.

7. A method of receiving and processing an image data stream, the method comprising:
   receiving, by a video codec device, an image data stream comprising one or more syntax structures corresponding to an encoded foreground image and one or more syntax structures corresponding to an encoded transparency mask, wherein the one or more syntax structures corresponding to the transparency mask are delimited from and are located after the syntax structures corresponding to the foreground image in the data stream;
   decoding, by the video codec device, the syntax structures corresponding to the encoded foreground image;
   decoding, by the video codec device, the syntax structures corresponding to the transparency mask; and
   computing, by the video codec device, a displayed image as a function of the decoded foreground image and the decoded transparency mask.

8. The method of claim 7 wherein the image data stream is encoded according to ITU Recommendation H.264.

9. The method of claim 8 wherein the image data stream is in a NAL unit format.

10. The method of claim 9 wherein the image data stream is in a byte stream format.

11. The method of claim 10 wherein there is one and only one transparency mask for each foreground image.

12. The method of claim 10 wherein computing a displayed image as a function of the decoded foreground image and the decoded transparency mask further comprises computing the displayed image as a function of a background image.

13. The method of claim 12 wherein the background image is received separately from the foreground image and transparency mask.

14. The method of claim 12 wherein the background image is created at a decoder and is not received.

15. The method of claim 7, wherein the video codec device comprises hardware and software.

16. A method of receiving and processing an image data stream, the method comprising:
   receiving, by a video codec device, an image data stream comprising one or more syntax structures corresponding to an encoded foreground image and one or more syntax structures corresponding to an encoded transparency mask, wherein the one or more syntax structures corresponding to the transparency mask are delimited from and are located after the syntax structures corresponding to the foreground image in the data stream;
   decoding, by the video codec device, the syntax structures corresponding to the encoded foreground image;
   discarding, by the video codec device, the syntax structures corresponding to the transparency mask; and
   computing, by the video codec device, a displayed image as a function of the decoded foreground image and not as a function of the discarded transparency mask.

17. The method of claim 16 wherein the image data is encoded according to ITU Recommendation H.264.

18. The method of claim 17 wherein the image data stream is in a NAL unit format.

19. The method of claim 18 wherein the image data stream is in a byte stream format.

20. The method of claim 16 wherein there is one and only one transparency mask for each foreground image.

21. The method of claim 16, wherein the video codec device comprises hardware and software.

* * * * *